United States Patent
Shimoda et al.

(10) Patent No.: US 10,072,147 B2
(45) Date of Patent: Sep. 11, 2018

(54) SULFUR-CONTAINING FUEL CONTACT BODY PROVIDED WITH MOLDED ARTICLE INCLUDING POLYACETAL RESIN COMPOSITION HAVING INCREASED ACID RESISTANCE

(71) Applicant: Polyplastics Co., Ltd., Tokyo (JP)

(72) Inventors: Akihide Shimoda, Shizuoka (JP); Satomi Nakada, Shizuoka (JP); Yasumitsu Miyamoto, Shizuoka (JP); Hidemi Kondo, Shizuoka (JP)

(73) Assignee: Polyplastics Co., Ltd., Fuji-shi, Shizuoka (JP)

( * ) Notice: Subject to any disclaimer, the term of this patent is extended or adjusted under 35 U.S.C. 154(b) by 58 days.

(21) Appl. No.: 15/149,952

(22) Filed: May 9, 2016

(65) Prior Publication Data
US 2016/0251509 A1 Sep. 1, 2016

Related U.S. Application Data

(63) Continuation-in-part of application No. PCT/JP2015/059219, filed on Mar. 25, 2015.

(30) Foreign Application Priority Data

Apr. 25, 2014 (JP) ................................. 2014-091119

(51) Int. Cl.
*C08K 3/22* (2006.01)
*C08K 5/053* (2006.01)
*C08L 59/00* (2006.01)
*C08L 59/04* (2006.01)
*C08K 5/103* (2006.01)
*C08K 5/134* (2006.01)
*C08J 7/14* (2006.01)

(52) U.S. Cl.
CPC ............. *C08L 59/04* (2013.01); *C08J 7/14* (2013.01); *C08K 3/22* (2013.01); *C08K 5/103* (2013.01); *C08K 5/134* (2013.01); *C08J 2359/02* (2013.01); *C08K 2003/222* (2013.01); *C08L 2201/08* (2013.01); *F02M 2200/9015* (2013.01)

(58) Field of Classification Search
USPC ......................................... 524/313, 386, 433
See application file for complete search history.

(56) References Cited

U.S. PATENT DOCUMENTS

| | | | |
|---|---|---|---|
| 6,489,388 B1 | 12/2002 | Kurz et al. | |
| 2001/0007006 A1 | 7/2001 | Tanimura et al. | |
| 2004/0171730 A1 | 9/2004 | Tsai et al. | |
| 2007/0032605 A1* | 2/2007 | Harashina | C08K 5/25 525/400 |
| 2007/0179231 A1* | 8/2007 | Sonobe | C08K 3/26 524/318 |
| 2011/0313086 A1 | 12/2011 | Sharavanan et al. | |

FOREIGN PATENT DOCUMENTS

| | | |
|---|---|---|
| EP | 2065434 A2 | 6/2009 |
| JP | H06-345938 | 12/1994 |
| JP | H11-043583 | 2/1999 |
| JP | 2001-011284 A | 1/2001 |
| JP | 2001-234025 A | 8/2001 |
| JP | 2002-020577 | 1/2002 |
| JP | 2004-204172 A | 7/2004 |
| JP | 2005-263928 | 9/2005 |
| JP | 2010-031200 | 2/2010 |
| JP | 2012-517516 A | 8/2012 |
| WO | WO 2010/119826 A1 | 10/2010 |

OTHER PUBLICATIONS

Extended European Search Report dated Jan. 20, 2017, received in Application No. 15782256.0.
International Search Report dated Jun. 2, 2015 for International Patent Application No. PCT/JP2015/059219.
Notice of Reasons for Rejection issued to Japanese Patent Application No. 2014-091119, dated Jul. 14, 2015.

\* cited by examiner

*Primary Examiner* — Tae H Yoon
(74) *Attorney, Agent, or Firm* — Knobbe, Martens, Olson & Bear, LLP

(57) ABSTRACT

A polyacetal resin composition makes it possible, when formed into a molded article, to minimize deterioration during contact with sulfur-containing fuel or an acidic detergent. The polyacetal resin composition contains (A) 100 parts by weight of polyacetal resin, (B) 0.1-1.0 parts by weight of hindered phenolic antioxidant, (C) 0.1-2.0 parts by weight of alkaline earth metal oxide, (D) 0.5-3.0 parts by weight of polyalkylene glycol, and (E) 0.01-1.0 parts by weight of polyvalent fatty acid full ester. This polyacetal resin composition minimizes reductions in the weight of a molded article even after the molded article has been immersed in sulfur-containing fuel.

8 Claims, No Drawings

SULFUR-CONTAINING FUEL CONTACT BODY PROVIDED WITH MOLDED ARTICLE INCLUDING POLYACETAL RESIN COMPOSITION HAVING INCREASED ACID RESISTANCE

CROSS-REFERENCE TO RELATED APPLICATIONS

This application is a continuation in part of International Application No. PCT/JP2015/059219, filed on Mar. 25, 2015, which claims priority to Japanese Patent Application No. 2014-091119, filed Apr. 25, 2014, both of which are hereby incorporated by reference in their entireties.

BACKGROUND OF THE INVENTION

Field of the Invention

The present invention relates to a polyacetal resin composition and to a sulfur-containing fuel contact body provided by a molded article of this polyacetal resin composition, and to a method of increasing acid resistance with respect to an acidic component using a molded article of this polyacetal resin composition.

Description of the Related Art

Polyacetal resins have excellent chemical resistance, thus molded articles having a polyacetal resin as a raw material have been widely used for automobile components. For example, they have been used for large components which directly contact fuel oil such as fuel delivery units and the like, represented by fuel pump modules and the like.

In recent years, in order to respond to environmental regulations of various countries, sulfur reduction of fuels has progressed. However, desulfurization equipment can be highly costly, therefore, in some countries, high sulfur-containing fuel is still being distributed. These high sulfur-containing fuels, compared to low sulfur-containing fuels, have a tendency to readily deteriorate polyacetal resins.

Further, while automobile components such as fuel delivery units and the like are covered by enclosures such as the hood or the like, when washing the automobile detergent may adhere due to splashing. In particular, when removing brake dust or the like attached to a wheel, strongly acidic detergents may be used.

Incidentally, for an injection molded article produced from a polyacetal resin, the inner portion of the molded article will have residual stress due to the cooling when injection molding. When this injection molded article contacts a high sulfur-containing fuel or the like, cracks will occur at the locations where the residual stress is large, and this may become the cause of trouble such as fuels leaks and the like. Accordingly, for countries where high sulfur-containing fuels are distributed, a resin material having a high resistance to high sulfur-containing fuels is required as a raw material.

Further, for strongly acidic detergents, there may also be demand for a resin material having a high acid resistance as a required raw material.

As a polyacetal resin composition having a high acid resistance, a polyacetal resin composition comprising (A) 100 parts by mass of a polyacetal resin; (B) 0.1 to 3.0 parts by mass of a hindered phenolic antioxidant; (C) 0.001 to 3.0 parts by mass of a nitrogen-containing compound; (D) 0.1 to 3.0 parts by mass of a fatty acid calcium salt; and (E) 0.1 to 3.0 parts by mass of a lubricant has been proposed (refer to Patent Document 1).

Patent Document 1: Japanese Unexamined Patent Application, Publication No. 2010-031200

SUMMARY OF THE INVENTION

Problems to be Solved by the Invention

However, it would be preferable to provide a polyacetal resin composition having an even higher acid resistance.

The present invention has the objective of providing a polyacetal resin composition which, when made into a molded article, is capable of restraining to a minimum the deterioration when contacting a sulfur-containing fuel or an acidic detergent.

Means for Solving the Problems

The present inventors, as a result of repeated diligent research to solve the above mentioned problem, discovered that by making the composition of a polyacetal resin composition a specified composition, when making a molded article, it is possible to restrain to a minimum the deterioration when contacting a sulfur-containing fuel or an acidic detergent, and thus completed the present invention. Specifically, the present invention provides the following.

(1) The present invention is a polyacetal resin composition comprising (A) 100 parts by mass of a polyacetal resin, (B) 0.1 to 1.0 parts by mass of a hindered phenolic antioxidant, (C) 0.1 to 2.0 parts by mass of an alkaline earth metal oxide, (D) 0.5 to 3.0 parts by mass of a polyalkylene glycol, and (E) 0.01 to 1.0 parts by mass of a polyvalent fatty acid ester with an esterification rate of 80% or more.

(2) Or, the present invention is a polyacetal resin composition according to (1) wherein the (A) polyacetal resin is a polyacetal copolymer resin.

(3) Or, the present invention is a polyacetal resin composition according to (2) wherein the polyacetal copolymer resin is a copolymer with a cyclic oligomer of formaldehyde as a main monomer, and a compound selected from a cyclic formal and/or a cyclic ether having at least one carbon-carbon bond as a comonomer.

(4) Or, the present invention is a polyacetal resin composition according to any one of (1) to (3), wherein the (C) alkaline earth metal oxide is magnesium oxide.

(5) Or, the present invention is a polyacetal resin composition according to any one of (1) to (4), wherein the polyvalent fatty acid ester is an ester compound of a polyvalent alcohol with a carbon number of 3 or more, and a fatty acid.

(6) Or, the present invention is a fuel contact body provided with a molded article of a polyacetal resin composition according to any one of (1) to (5).

(7) Or, the present invention is a method of maintaining an exterior surface of a molded article formed of a polyacetal resin composition according to (1), comprising exposing said molded article to an acidic component, whereby the molded article exhibits reduced deterioration relative to a polyacetal resin composition lacking any of components (C), (D) or (E) exposed to the acidic component under the same conditions.

(8) Or, the present invention is a method according to claim 7, wherein the acidic component is a sulfur-containing fuel derivative and/or an acidic detergent derivative.

Effects of the Invention

According to the present invention, it is possible to provide a polyacetal resin composition which, when making a molded article, is capable of restraining to a minimum the deterioration when contacted with a sulfur-containing fuel or an acidic detergent.

DETAILED DESCRIPTION OF THE PREFERRED EMBODIMENT

Below, specific embodiments of the present invention are explained in detail, but the present invention is not in any way limited by the below embodiments, and within the scope of the objective of the present invention, suitable modifications may be implemented.

<Polyacetal Resin Composition>

The polyacetal resin composition of the present invention comprises (A) 100 parts by mass of a polyacetal resin, (B) 0.1 to 1.0 parts by mass of a hindered phenolic antioxidant, (C) 0.1 to 2.0 parts by mass of an alkaline earth metal oxide, (D) 0.5 to 3.0 parts by mass of a polyalkylene glycol, and (E) 0.01 to 1.0 parts by mass of a polyvalent fatty acid full ester. Below, the (A) polyacetal resin may also be referred to as component (A), the (B) hindered phenolic antioxidant may also be referred to as component (B), the (C) alkaline earth metal oxide may also be referred to as component (C), the (D) polyalkylene glycol may also be referred to as component (D), and the (E) polyvalent fatty acid full ester may also be referred to as component (E).

[(A) Polyacetal Resin]

The (A) polyacetal resin used in the present invention is a high molecular compound having an oxymethylene group ($-CH_2O-$) as the main structural unit, and a polyacetal polymer consisting substantially only of oxymethylene group repeating units, or a polyacetal copolymer comprising a small content of constituent units other than the oxymethylene groups, and the like may be mentioned. It is possible to use any of these, but from the viewpoint of increasing the acid resistance which is an objective of the present invention, it is preferable to use a polyacetal copolymer as the base resin.

In the case that the component (A) is a polyacetal copolymer, as the polyacetal copolymer, a polyacetal copolymer copolymerized with 0.5 to 30 mass % of the comonomer component is preferable, and one copolymerized with 0.5 to 10 mass % of the comonomer is particularly preferable. A polyacetal copolymer copolymerized with a comonomer component, along with having excellent acid resistance, is also able to maintain excellent thermal stability, mechanical strength and the like. Further, the polyacetal copolymer may be not only one where the molecule has a linear structure, but may also be one having a branched structure or a crosslinked structure.

When producing such a polyacetal copolymer, as the main monomer, cyclic oligomers of formaldehyde represented by trioxane are used. Further, as the comonomer component, a compound selected from a cyclic formal and/or a cyclic ether having at least one carbon-carbon bond is used. As such comonomers, for example, ethylene oxide, 1,3-dioxolane, diethylene glycol formal, 1,4-butanediol formal, 1,3-dioxane, propylene oxide and the like may be mentioned.

In an (A) polyacetal resin such as those mentioned above, in particular in a polyacetal copolymer, there are no particular restrictions on its degree of polymerization or the like, and it is possible to adjust its degree of polymerization or the like in response to its target use or molding means, but from the viewpoint of compatibility of acid resistance and formability, a melt index (MI) measured at a temperature of 190° C. and a load of 2.16 kg is preferably 1 to 100 g/10 min, and particularly preferably 5 to 30 g/10 min.

[(B) Hindered Phenolic Antioxidant]

As the (B) hindered phenolic antioxidant used in the present invention, 2,2'-methylenebis(4-methyl-6-t-butylphenol), hexamethylene glycol-bis(3,5-di-t-butyl-4-hydroxyhydrocinnamate), tetrakis[methylene-3-(3,5-di-t-butyl-4-hydroxyphenyl)propionate]methane, triethylene glycol-bis-3-(3-t-butyl-4-hydroxy-5-methylphenyl)propionate, 1,3,5-trimethyl-2,4,6-tris(3,5-di-t-butyl-4-hydroxy benzyl) benzene, n-octadecyl-3-(4'-hydroxy-3',5'-di-t-butylphenol) propionate, 4,4'-methylenebis(2,6-di-t-butylphenol), 4,4'-butylidene-bis-(6-t-butyl-3-methyl phenol), di stearyl-3,5-di-t-butyl-4-hydroxybenzylphosphonate, 2-t-butyl-6-(3-t-butyl-5-methyl-2-hydroxybenzyl)-4-methylphenylacrylate, 3,9-bis{2-[3-(3-t-butyl-4-hydroxy-5-methylphenyl)propionyloxy]-1,1-dimethylethyl}-2,4,8,10-tetraoxaspiro[5,5]undecane and the like may be mentioned.

In the present invention, it is possible to use at least one type, or two or more types selected from these antioxidants.

The content of the (B) hindered phenolic antioxidant in the present invention is 0.1 to 1.0 parts by mass with respect to 100 parts by mass of the (A) polyacetal resin, and preferably 0.2 to 0.5 parts by mass. If the blended amount of the (B) antioxidant is low, the oxidation prevention property which is its primary objective will be insufficient, an in addition, the fuel resistance and detergent resistance, which are objective of the present invention, will also be inferior. In the case that the blended amount of the (B) antioxidant is excessive, unfavorable effects on the mechanical properties and formability and the like of the resin composition will arise.

[(C) Alkaline Earth Metal Oxide]

As the (C) alkaline earth metal oxide used in the present invention, magnesium oxide, calcium oxide, barium oxide and the like may be mentioned. Among these metal oxides, magnesium oxide is preferable because it provides the most improvement in fuel resistance and detergent resistance, and an excellent balance of performance such as mechanical properties and formability.

The content of the (C) alkaline earth metal oxide in the present invention is 0.1 to 2.0 parts by mass with respect to 100 parts by mass of the (A) polyacetal resin, and preferably 1.0 to 2.0 parts by mass. If the blended amount of the (C) alkaline earth metal oxide is low, the fuel resistance and detergent resistance which are objective of the present invention will be degraded. In the case that the blended amount of the (C) alkaline earth metal oxide is excessive, decomposition of unstable terminals in the polyacetal resin will be promoted, and an unfavorable effect on the mechanical properties and formability and the like will arise.

[(D) Polyalkylene Glycol]

The type of the (D) polyalkylene glycol used in the present invention is not particularly limited, but from the viewpoint of affinity with the polyacetal resin, one comprising polyethylene glycol and/or polypropylene glycol is preferable, and one comprising polyethylene glycol is more preferable.

The number average molecular weight (Mn) of the polyalkylene glycol is not particularly limited, but from the viewpoint of dispersibility in the polyacetal resin 1,000 to 50,000 is preferable, and 5,000 to 30,000 is more preferable. Further, in the present specification, the number average molecular weight is a polystyrene-converted molecular weight determined by gel permeation chromatography (GPC) with tetrahydrofuran (THF) as the solvent.

The content of the (D) polyalkylene glycol in the present invention is 0.5 to 3.0 parts by mass with respect to 100 parts by mass of the (A) polyacetal resin, and preferably 1.0 to 2.0 parts by mass. If the blended amount of the (D) polyalkylene glycol is low, there is the possibility that sufficient stress relaxation will not be carried out. In the case that the blended amount of the (D) polyalkylene glycol is excessive, there is the possibility that the mechanical properties of the molded article will be degraded.

[(E) Polyvalent Fatty Acid Full Ester]

The (E) polyvalent fatty acid full ester used in the present invention is preferably a full ester compound polyvalent fatty acid ester of a polyvalent alcohol with a carbon number of 3 or more and a fatty acid. In the present specification, the esterification rate of the "full ester compound" is not necessarily 100%, and 80% or more is sufficient, 85% or more is preferable, and 90% or more is more preferable.

The polyvalent alcohol may be aliphatic, or may be aromatic, but in the point of affinity for the polyacetal resin, it is preferably aliphatic.

The valence number of the polyvalent alcohol is not particularly limited, but is preferably 3 to 4. Further, the carbon number of the polyvalent alcohol is not particularly limited, but in the point of affinity for the polyacetal resin, it is preferably 3 to 10, and more preferably 3 to 5.

As a preferable polyvalent alcohol for forming the component (E), for example, glycerin, trimethylolpropane, pentaerythritol, meso-erythritol, pentitol, hexitol, sorbitol and the like may be mentioned, but in the point of restraining to a low level the mass reduction of the polyacetal resin composition after immersion in a sulfur-containing fuel, the polyvalent alcohol is preferably pentaerythritol.

The type of the fatty acid is not particularly limited, but in the point of affinity for the polyacetal resin, a fatty acid with a carbon number of 10 to 30 is preferable, and an aliphatic carboxylic acid with a carbon number of 10 to 20 is more preferable.

As a fatty acid which is preferable for forming the ester of component (E), for example, stearic acid, palmitic acid, lauric acid and the like may be mentioned, and stearic acid may be preferably mentioned.

As the ester of the component (E), glycerin tristearylate or pentaerythritol tetrastearylate may be suitably used, but pentaerythritol tetrastearylate is more suitably used. Further, for the component (E), two or more ester compounds having differing constituent polyvalent alcohols or fatty acids, or two or more ester compounds having differing esterification rates, may be used in combination.

The content of the (E) polyvalent fatty acid full ester in the present invention is 0.01 to 1.0 parts by mass with respect to 100 parts by mass of the (A) polyacetal resin, and more preferably 0.05 to 1.0 parts by mass. If the blended amount of the (E) polyvalent fatty acid full ester is low, there is the possibility of worsening of the mold release characteristics of the molded article. In the case that the blended amount of the (E) polyvalent fatty acid full ester is excessive, there is the possibility that the processability of the molded article is reduced.

<Fuel Contact Body>

The fuel contact body of the present invention is provided with a molded article of the above mentioned polyacetal resin composition. This molded article can be obtained by molding by a common molding method using the above mentioned polyacetal resin composition, for example methods such as injection molding, extrusion molding, compression molding, blow molding, vacuum molding, foam molding, rotational molding, and the like.

The fuel contact body of the present invention is not limited to low sulfur-containing fuels, and may also be one which is contacted with a high sulfur-containing fuel, and may also be one which is contacted with a strongly acidic detergent. Even when contacted with a high sulfur-containing fuel, because it is possible to suppress the generation of cracks, and to maintain a good exterior surface of the molded article, it is possible to suppress leakage of the fuel. Further, the fuel contact body of the present invention, even when contacted with a strongly acidic detergent, can suppress deterioration and maintain a good exterior surface of the molded article, whereby it can restrain leakage of fuel. Further, in the present specification, "low sulfur-containing fuel" refers to fuel where the concentration of sulfur is 50 ppm or less, for example, JIS No. 2 diesel fuel of Japan, or EN590 diesel fuel of the European Union and the like may be mentioned. On the other hand, a "high sulfur-containing fuel" is a fuel with a concentration of sulfur exceeding 50 ppm, and the high sulfur diesel fuels distributed in China, India and elsewhere and the like may be mentioned. Further, in the present specification, "strongly acidic detergent" refers to a detergent having a pH of 6 or less, preferably 4 or less, and more preferably 2 or less, for example, a wheel cleaner or the like may be mentioned.

<Method of Increasing the Acid Resistance with Respect to an Acidic Component>

The method of increasing the acid resistance with respect to an acidic component of the present invention uses a molded article of the above mentioned polyacetal resin composition. The acidic component is a sulfur-containing fuel derivative and/or an acidic detergent derivative. The sulfur-containing fuel is converted to an acid salt by combustion, and the majority thereof becomes a sulfurous gas, while a part is converted to sulfuric anhydride. The sulfuric anhydride reacts with moisture in the atmosphere or moisture arising from the combustion to generate sulfuric acid. Further, the acidic detergent may be one which is used to wash the molded article itself, or may be a detergent used when washing an automobile or a wheel, or may be a strongly acidic detergent exhibiting an effect of removing alkaline adhesions such as brake dust or the like. The method of increasing the acid resistance with respect to an acidic component of the present invention is capable of suppressing the deterioration of a molded article by an acidic component derived from such a sulfur-containing fuel or acidic detergent.

Examples

Below, the present invention is specifically explained by means of examples, but the present invention is not limited to these examples.

TABLE 1

|     |                              | Example |      |      |     | Comparative Example |      |      |      |      |      |
|-----|------------------------------|---------|------|------|-----|---------------------|------|------|------|------|------|
|     |                              | 1       | 2    | 3    | 4   | 1                   | 2    | 3    | 4    | 5    | 6    |
| (A) | polyacetal resin             | 97.6    | 95.4 | 95.2 | 97  | 98.4                | 98.7 | 98.4 | 96.7 | 97.4 | 96.4 |
| (B) | hindered phenolic antioxidant| 0.3     | 0.3  | 0.3  | 0.3 | 0.3                 | 0.3  | 0.3  | 0.3  | 0.3  | 0.3  |

TABLE 1-continued

|   |   | Example | | | | Comparative Example | | | | | |
|---|---|---|---|---|---|---|---|---|---|---|---|
|   |   | 1 | 2 | 3 | 4 | 1 | 2 | 3 | 4 | 5 | 6 |
| (C) | alkaline earth metal oxide | 1 | 2 | 2 | 1.5 |  | 1 | 1 | 1 | 1 | 1 |
| (D) | polyalkylene glycol | 1 | 2 | 2 | 1 | 1 |  |  | 2 | 1 | 2 |
| (E1) | polyvalent fatty acid full ester 1 | 0.1 | 0.3 | 0.5 |  | 0.3 |  | 0.3 |  |  |  |
| (E2) | polyvalent fatty acid full ester 2 |  |  |  | 0.2 |  |  |  |  |  |  |
| (E'1) | polyvalent fatty acid ester with an Esterification Rate of Less than 80% |  |  |  |  |  |  |  |  | 0.3 |  |
| (E'2) | monovalent fatty acid ester |  |  |  |  |  |  |  |  |  | 0.3 |

(units: parts by mass)

Each of the components in Table 1 is as follows.

(A) Polyacetal Resin

A polyacetal copolymer made by copolymerizing 96.7 mass % trioxane and 3.3 mass % 1,3-dioxolane (melt index (measured at 190° C., with a load of 2160 g): 9 g/10 min)

(B) Hindered Phenolic Antioxidant

Tetrakis[methylene-3-(3,5-di-t-butyl-4-hydroxyphenyl) propionate]methane (Product name: Irganox 1010, manufactured by BASF)

(C) Alkaline Earth Metal Oxide

Magnesium oxide (product name: Kyowamag MF-150, manufactured by Kyowa Chemical Industry Co., Ltd.)

(D) Polyalkylene Glycol

Product name: PEG6000S (Sanyo Chemical Industries, Ltd.)

(E) Polyvalent Fatty Acid Full Ester (E1) Polyvalent Fatty Acid Full Ester 1

Pentaerythritol Stearic Acid Ester (product name: Unister H-476, manufactured by NOF Corporation)

(E2) Polyvalent Fatty Acid Full Ester 2

Glycerine tristearate (product name: Poem S-95, manufactured by Riken Vitamin Co., Ltd.)

(E') Other Fatty Acid Ester (E'1) Polyvalent Fatty Acid Ester with an Esterification Rate of Less than 80%

Glycerin monostearate (product name: Rikemal S-100A, manufactured by Riken Vitamin Co., Ltd.)

(E'2) Monovalent Fatty Acid Full Ester

Stearyl stearate (product name: Unister M-9676, manufactured by NOF Corporation)

<Test 1> Evaluation of Resistance to Sulfur-Containing Fuel

Example and Comparative Example

The various components shown in Table 1 were added and mixed in the ratios shown in Table 1, and melt-kneaded in a twin screw extruder, and the composition was prepared in the form of pellets. Next, using these pellets, ASTM No. 4 dumbbell test pieces with a thickness of 1 mm were prepared by injection molding.

[Evaluation]

In order to evaluate the fuel resistance and the acid resistance with respect to an acidic component of the polyacetal resin composition, the above mentioned dumbbell test pieces were immersed in diesel fuel (product name: CEC RF 90-A-92, manufactured by Haltermann) for a period of 14 days at 100° C., and the mass change rate due to the fuel immersion was calculated from the masses of the test piece before and after immersion of the test pieces. The results are shown in Table 2.

TABLE 2

|   | Example | | | | Comparative Example | | | | | |
|---|---|---|---|---|---|---|---|---|---|---|
|   | 1 | 2 | 3 | 4 | 1 | 2 | 3 | 4 | 5 | 6 |
| mass change rate after 14 days (%) | −9 | −7 | −6 | −10 | −100 | −45 | −40 | −28 | −20 | −24 |

A resin molded article having as a raw material a polyacetal resin composition comprising (A) 100 parts by mass of a polyacetal resin, (B) 0.1 to 1.0 parts by mass of a hindered phenolic antioxidant, (C) 0.1 to 2.0 parts by mass of an alkaline earth metal oxide, (D) 0.5 to 3.0 parts by mass of a polyalkylene glycol, and (E) 0.01 to 1.0 parts by mass of a polyvalent fatty acid full ester, was confirmed to have a mass change rate which was restrained to within −10% even after immersion in a sulfur-containing fuel. Among these, in the case that the (E) polyvalent fatty acid full ester was a pentaerythritol stearic acid ester, it was confirmed that the mass reduction of the polyacetal resin composition after immersion in the sulfur-containing fuel was restrained to a low level.

On the other hand, in the case that even one of any of the above mentioned component (C) to component (E) is not included, immersion in a high sulfur-containing fuel starts the deterioration of the polyacetal resin composition, and it was confirmed that the mass of the polyacetal resin composition is notably reduced (Comparative Examples 1 to 6).

<Test 2> Evaluation of Resistance to Acidic Detergent

Examples and Comparative Examples

Using the pellets prepared in Test 1, ASTM No. 1 tensile test pieces with a thickness of 3.2 mm were prepared by injection molding.

[Evaluation]

In order to evaluate resistance with respect to an acidic detergent of the polyacetal resin composition, both ends of a tensile test piece were fixed, and the tensile test piece was inflected at a load-deformation rate of 1.5%. Subsequently, the acidic detergent was sprayed onto a surface of the tensile test piece, and the post-spray tensile test piece was left under a condition of 60° C. for 20 hours. Subsequently, the tensile test piece was left under a condition of 23° C. for 4 hours.

As the acidic detergent, the following two types of acidic detergents were used.

Detergent A: sulfuric acid: 0.5%; hydrofluoric acid: 0.1%; phosphoric acid: 5%.

Detergent B: sulfuric acid: 1.5%; hydrofluoric acid: 1.5%; phosphoric acid: 10%.

A single test cycle consisted of: spraying the acidic detergent; leaving the tensile test piece under the condition of 60° C. for 20 hours; and leaving tensile test piece under the condition of 23° C. for 4 hours. Each time a single cycle was finished, generation of cracks on the surfaces of the dumbbell test pieces was visually observed. As a result, with respect to the test pieces composed of the polyacetal resin composition of Examples 1 to 4, in both cases of spraying Detergent A or Detergent B, cracks were not generated in the test pieces by the time 7 cycles were finished.

In contrast, with respect to the test pieces composed of the polyacetal resin composition of Comparative Examples 1 to 6, in both cases of spraying Detergent A or Detergent B, cracks were generated in the test pieces by the time 6 cycles were finished.

What is claimed is:

1. A polyacetal resin composition comprising consisting of:
   (A) 100 parts by mass of a polyacetal resin,
   (B) 0.1 to 1.0 parts by mass of a hindered phenolic antioxidant,
   (C) 0.1 to 2.0 parts by mass of an alkaline earth metal oxide,
   (D) 0.5 to 3.0 parts by mass of a polyalkylene glycol,
   (E) 0.01 to 1.0 parts by mass of a polyvalent fatty acid ester with an esterification rate of 80% or more.

2. The polyacetal resin composition according to claim 1, wherein the (A) polyacetal resin is a polyacetal copolymer resin.

3. The polyacetal resin composition according to claim 2, wherein the polyacetal copolymer resin is a copolymer with a cyclic oligomer of formaldehyde as a main monomer, and a compound selected from a cyclic formal and/or a cyclic ether having at least one carbon-carbon bond as a comonomer.

4. The polyacetal resin composition according to claim 1, wherein the (C) alkaline earth metal oxide is magnesium oxide.

5. The polyacetal resin composition according to claim 1, wherein the polyvalent fatty acid ester is an ester compound of a polyvalent alcohol with a carbon number of 3 or more, and a fatty acid.

6. A fuel contact body provided with a molded article of the polyacetal resin composition according to claim 1.

7. A method of maintaining an exterior surface of a molded article formed of the polyacetal resin composition according to claim 1, comprising:
   exposing said molded article to an acidic component, whereby the molded article exhibits reduced deterioration relative to a polyacetal resin composition lacking any of components (C), (D) or (E) exposed to the acidic component under the same conditions.

8. The method according to claim 7, wherein the acidic component is a sulfur-containing fuel derivative and/or an acidic detergent derivative.

* * * * *

UNITED STATES PATENT AND TRADEMARK OFFICE
CERTIFICATE OF CORRECTION

PATENT NO. : 10,072,147 B2
APPLICATION NO. : 15/149952
DATED : September 11, 2018
INVENTOR(S) : Akihide Shimoda et al.

It is certified that error appears in the above-identified patent and that said Letters Patent is hereby corrected as shown below:

In the Claims

Column 10, Line 2, in Claim 1, after "composition" delete "comprising".

Signed and Sealed this
Twenty-sixth Day of March, 2019

Andrei Iancu
*Director of the United States Patent and Trademark Office*